United States Patent
Yang et al.

(10) Patent No.: US 7,102,627 B2
(45) Date of Patent: Sep. 5, 2006

(54) STYLUS FIXING STRUCTURE FOR A PORTABLE COMPUTER

(75) Inventors: Kuo-Chang Yang, Hsinchu (TW); Shih-Hwa Lan, Yunlin Shien (TW)

(73) Assignee: Quanta Computer Inc., Taoyuan Shien (TW)

( * ) Notice: Subject to any disclaimer, the term of this patent is extended or adjusted under 35 U.S.C. 154(b) by 482 days.

(21) Appl. No.: 10/426,876

(22) Filed: May 1, 2003

(65) Prior Publication Data
US 2004/0118743 A1    Jun. 24, 2004

(30) Foreign Application Priority Data
Dec. 18, 2002  (TW)  ............................... 91220579 U

(51) Int. Cl.
*G09G 5/00* (2006.01)
(52) U.S. Cl. ...................................... 345/179; 345/173
(58) Field of Classification Search ........ 345/173–179; 178/19.01–19.07; 401/131, 258; 206/701; 382/69; 402/79; 361/692
See application file for complete search history.

(56) References Cited

U.S. PATENT DOCUMENTS

| | | | | |
|---|---|---|---|---|
| 5,067,573 A | * | 11/1991 | Uchida | 345/173 |
| 5,434,373 A | * | 7/1995 | Komaki | 178/19.01 |
| 6,161,882 A | * | 12/2000 | Murphy et al. | 292/302 |
| 6,183,157 B1 | * | 2/2001 | Brown et al. | 402/79 |
| 6,249,276 B1 | * | 6/2001 | Ohno | 345/173 |
| 6,392,639 B1 | * | 5/2002 | Lee et al. | 345/179 |
| 6,532,152 B1 | * | 3/2003 | White et al. | 361/692 |

* cited by examiner

*Primary Examiner*—Bipin Shalwala
*Assistant Examiner*—Prabodh Dharia
(74) *Attorney, Agent, or Firm*—Rabin & Berdo, P.C.

(57) ABSTRACT

A fixing structure is employed to secure a stylus in a portable computer. The fixing structure has a storage slot, an attachment means, a latch and an elastic apparatus. An attachment means mounted on a stylus has an engraved notch. The latch embedded in the storage slot fits in the engraved notch of the attachment means to prevent the stylus from slipping out of the storage slot. The latch is pushed by the elastic apparatus.

12 Claims, 3 Drawing Sheets

A - A'

STYLUS FIXING STRUCTURE FOR A PORTABLE COMPUTER

BACKGROUND OF THE INVENTION

1. Field of Invention

The present invention relates to a stylus fixing structure. More particularly, the present invention relates to a stylus fixing structure in a portable computer.

2. Description of Related Art

The desktop PC has evolved into a variety of computers, such as notebook PCs, pocket PC, PDAs (Personal Digital Assistants, such as the Palm OS PDA), and other internet appliances. These computer devices, much smaller and thinner than the Desktop PC, usually do not have keyboards or need extra keyboards for inputting data. Therefore, these computer devices usually provide a touch panel or other device for manual input. For example, a PDA may offer a writing pad and a touch panel for launching or operating application program.

Whether a writing pad or touch panel is employed, a stylus is essential for operation and input. The stylus of a PDA or Pocket PC is made of plastic or metallic materials, and does not contain electronic devices. Most PDAs provide slots for storing styluses, and the styluses can engage slots to avoid sliding out. But such a slot may wear out. Thus, the stylus may easily slip out from the storage slot to cause damage.

However, a stylus of a complicated computer contains electronic devices. For example, a Tablet PC stylus has a battery or a coil built inside. Having electronic devices built inside a stylus not only enlarges the size thereof but also increases the weight of the same.

SUMMARY OF THE INVENTION

It is therefore an objective of the present invention to provide a stylus fixing structure to prevent a stylus from slipping out a storage slot.

In accordance with the foregoing and other objectives of the present invention, a fixing structure is employed to store a stylus in a portable computer. The fixing structure comprises a storage slot, an attachment means, a latch and an elastic apparatus. An attachment means mounted on a stylus has an engraved notch. The latch embedded in the storage slot fits in the engraved notch of the attachment means to prevent the stylus from slipping out of the storage slot. The latch is pushed by the elastic apparatus.

In one preferred embodiment of present invention, the attachment means further comprises a sliding edge which guides the latch into the engraved notch. The latch also comprises a holding member for easy manual movement. The elastic apparatus comprises a spring, a metal elastic apparatus, and plastic elastic apparatus.

In conclusion, the present invention is employed to ensure that the slot can easily and firmly hold the stylus therein.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
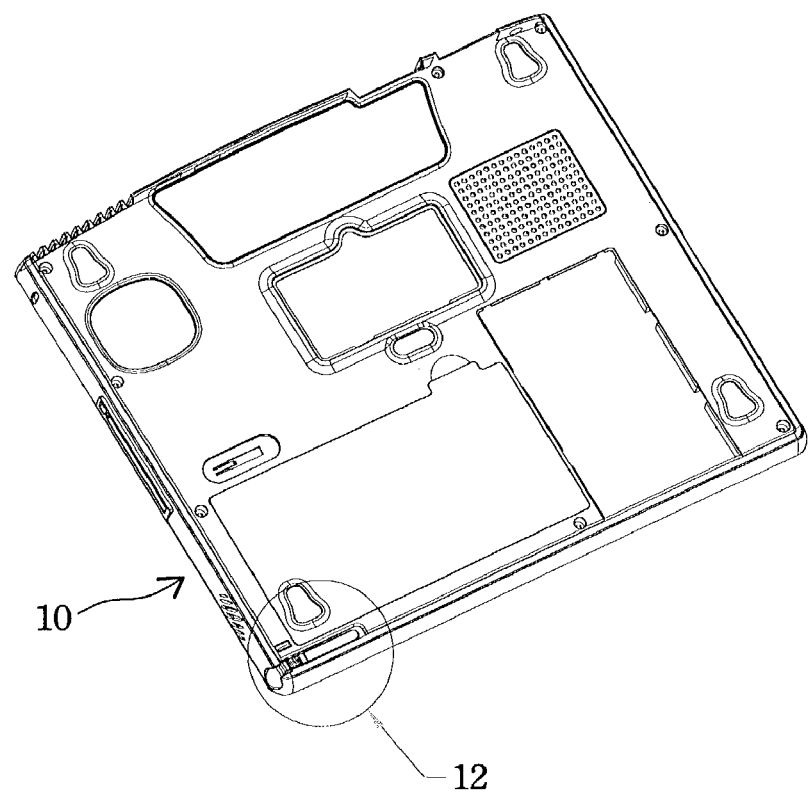
FIG. 1A illustrates a perspective view of a storage slot according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
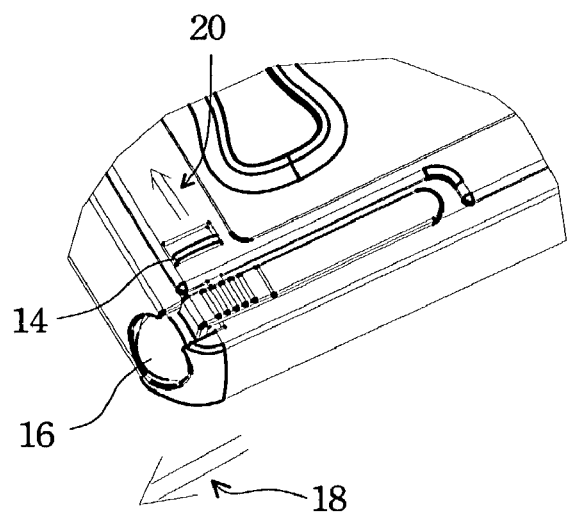
FIG. 1B illustrates an enlarged view of a storage slot according to one preferred embodiment of this invention.

FIG. 1A illustrates a perspective view of a storage slot according to one preferred embodiment of this invention. A stylus storage slot can be in a mainframe 10 portion of a portable computer (shown as FIG. 1A), or in a display portion. The portable computer mentioned above comprises Tablet PCs and Notebook PCs. Although the present invention has been described in considerable detail with reference to Notebook PCs, the scope of application should not be limited thereto in the description of the preferred embodiments. A fixing structure is essential to secure a stylus inside a stylus storage slot 12. FIG. 1B illustrates an enlarged view of a storage slot according to one preferred embodiment of this invention. The fixing structure comprises a latch 14 to clamp the stylus 16. When the stylus 16 is to be removed, the latch 14 is pulled in direction 20 and then the stylus 16 can be moved in direction 18.

Figure 2A:
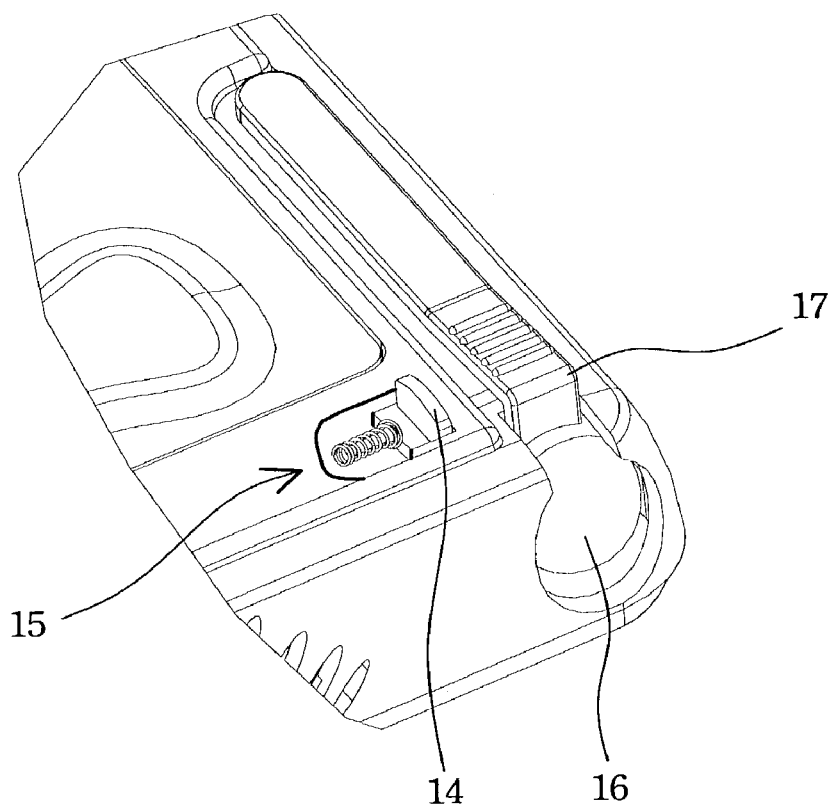
FIG. 2A illustrates a perspective view of a stylus fixing structure according to one preferred embodiment of this invention.
Figure 2B:
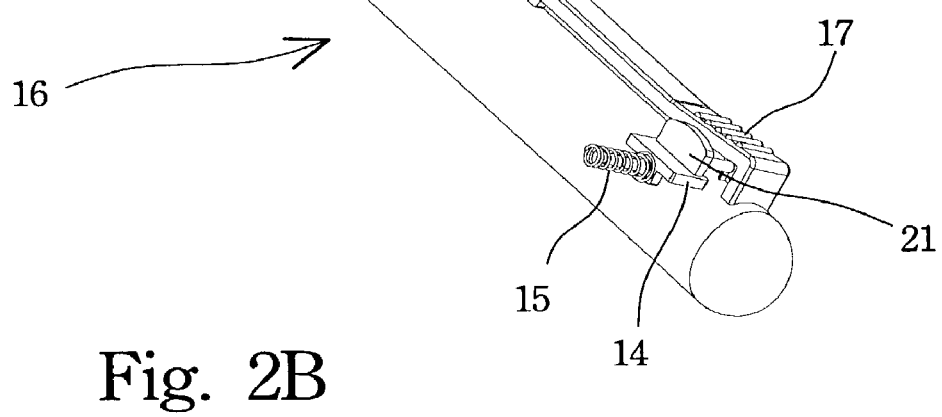
FIG. 2B illustrates a detailed view of a stylus fixing structure according to one preferred embodiment of this invention.

FIG. 2A illustrates a perspective view of a stylus fixing structure according to one preferred embodiment of this invention. FIG. 2B illustrates a detailed view of a stylus fixing structure according to one preferred embodiment of this invention. The fixing structure comprises an attachment means 17, a latch 14, and a spring 15. The attachment means 17 has an engraved notch; thus one end of the latch 14 can fit into the engraved notch. The other end of the latch 14 is shaped into a round pin. Therefore, the spring 15 can support the latch 14 easily. A holding member 21 of the latch 14 is designed for easy manual movement. The spring 15 is employed to provide a force for pushing the latch 14 to fit in the engraved notch. One end of the spring 15 is connected to the round pin of the latch 14, and the other end is fastened to the portable computer. The spring 15 can be replaced by other elastic apparatuses, such as plastic elastic apparatuses and metal elastic apparatuses. The latch 14 and the spring 15 are built adjacent to the storage slot and inside the outer case of the portable computer. Thus, an opening is essential to expose the holding member 21 for manual movement (shown as FIG. 1B).

Figure 3A:
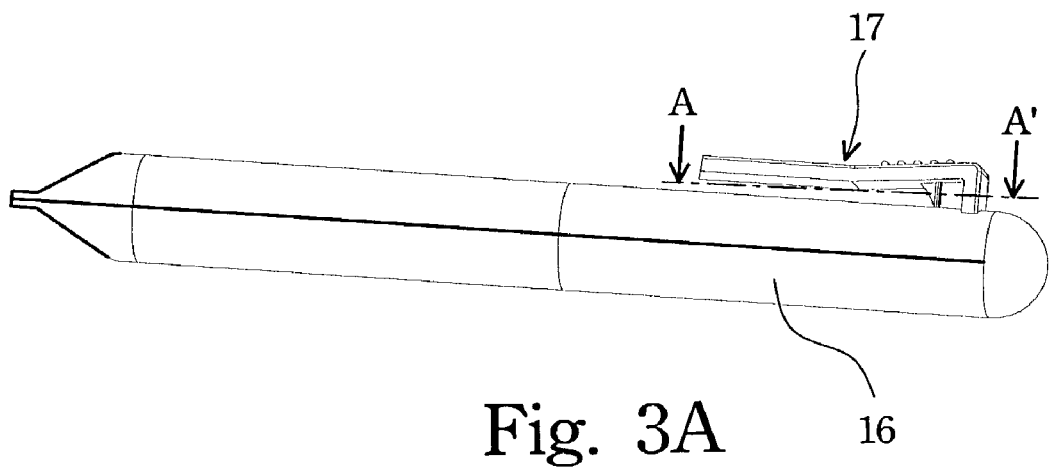
FIG. 3A illustrates a perspective view of a stylus according to one preferred embodiment of this invention.
Figure 3B:
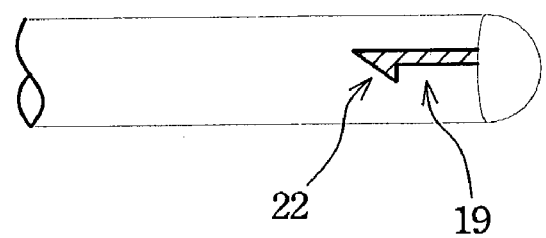
FIG. 3B illustrates cross-sectional view of an attachment means according to one preferred embodiment of this invention.

FIG. 3A illustrates a perspective view of a stylus according to one preferred embodiment of this invention. The stylus 16 comprises an attachment means 17 having an engraved notch. FIG. 3B illustrates cross-sectional view of an attachment means according to one preferred embodiment of this invention. This cross-section is taken along line A–A' in FIG. 3A. The attachment means 17 comprises the engraved notch (or notch portion) 19 and the sliding edge 22. The engraved notch 19 is designed for the latch 14 to fit thereinto and the sliding edge 22 can guide the latch 14 to fit in the engraved notch 19 smoothly.

In conclusion, the present invention is employed to ensure that the slot can hold the stylus inside safely and firmly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A stylus fixing structure in a portable computer comprising:
    an attachment means mounted near a tail end of a stylus, the attachment means having an engraved notch inside thereof;
    a slot, installed in said portable computer, employed to hold said stylus;
    a latch, mounted adjacent to said slot, said latch being employed to clamp said stylus in said slot by fitting into said engraved notch; and
    an elastic apparatus, one end thereof being fixed to said portable computer and another end thereof being connected to said latch, wherein said elastic apparatus provides a force for pushing said latch to fit into said engraved notch.

2. The fixing structure of claim 1, wherein said attachment means further comprises a sliding edge, guiding said latch to fit into said engraved notch.

3. The fixing structure of claim 1, wherein said elastic apparatus comprises a spring, a metal elastic apparatus, or plastic elastic apparatus.

4. The fixing structure of claim 1, wherein said slot is installed in a mainframe portion of said portable computer.

5. The fixing structure of claim 1, wherein said slot is installed in an LCD portion of said portable computer.

6. The fixing structure of claim 1, wherein said latch comprises a holding member, employed to pull said latch out of said engraved notch.

7. A stylus fixing structure employed to hold a stylus in a slot of a portable computer, said fixing structure comprising:
    an attachment means mounted near a tail end of the stylus, the attachment means having an engraved notch inside thereof;
    an elastic apparatus, one end thereof being fixed to said portable computer; and
    a latch, connected to another end of said elastic apparatus, wherein said latch is employed to clamp said stylus in said slot by fitting into said engraved notch, and said elastic apparatus provides a force for pushing said latch to fit into said engraved notch.

8. The fixing structure of claim 7, wherein said attachment means further comprises a sliding edge, guiding said latch to fit into said engraved notch.

9. The fixing structure of claim 7, wherein said elastic apparatus comprises a spring, a metal elastic apparatus, or plastic elastic apparatus.

10. The fixing structure of claim 7, wherein said latch comprises a holding member, employed to pull said latch out of said engraved notch.

11. A stylus fixing structure for use with a portable electronic device having a case with a slot for slidably receiving a stylus having a tip end and a tail end, comprising:
    an attachment means, the attachment means including an elongated member that is connected to the stylus adjacent its tail end, and a notch portion that is disposed between the elongated member and the stylus;
    a latch member slidably mounted on the case at a position to engage the notch portion when the stylus is in the slot; and
    means for urging the latch member toward the slot.

12. The fixing structure of claim 11, wherein the notch portion has an end with a sliding edge.

* * * * *